(12) United States Patent (10) Patent No.: US 8,208,528 B1
Lai et al. (45) Date of Patent: Jun. 26, 2012

(54) PROGRAMMABLE ADAPTATION CONVERGENCE DETECTION

(75) Inventors: Tin H. Lai, San Jose, CA (US); Sergey Shumarayev, Los Altos Hills, CA (US); Tim Tri Hoang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 943 days.

(21) Appl. No.: 11/955,948

(22) Filed: Dec. 13, 2007

(51) Int. Cl.
*H03H 7/30* (2006.01)
(52) U.S. Cl. ........ 375/233; 375/152; 375/229; 375/230; 375/232; 375/316; 455/63.1; 455/295
(58) Field of Classification Search ................. 375/150, 375/219, 220, 222, 242, 259, 260, 291, 295, 375/306, 326, 130, 136, 146–147, 152, 223, 375/226, 229, 230, 232, 233–235, 316, 324, 375/340, 343
See application file for complete search history.

(56) References Cited

U.S. PATENT DOCUMENTS

| | | | |
|---|---|---|---|
| 4,066,977 A | 1/1978 | Chambers et al. | |
| 4,667,179 A | 5/1987 | Law et al. | |
| 6,870,404 B1 | 3/2005 | Maangat | |
| 7,920,621 B2 * | 4/2011 | Wong et al. | 375/229 |
| 2001/0023177 A1 | 9/2001 | Tanaka | |
| 2004/0178851 A1 | 9/2004 | Ishida et al. | |
| 2005/0095988 A1 | 5/2005 | Bereza et al. | |
| 2005/0195894 A1 * | 9/2005 | Kim et al. | 375/232 |
| 2006/0176946 A1 * | 8/2006 | Yamaguchi | 375/232 |
| 2006/0223478 A1 * | 10/2006 | Carballo et al. | 455/295 |
| 2006/0280272 A1 * | 12/2006 | Stojanovic | 375/355 |
| 2007/0014344 A1 | 1/2007 | Maangat et al. | |
| 2007/0041455 A1 | 2/2007 | Tran et al. | |
| 2007/0071084 A1 | 3/2007 | Lai et al. | |
| 2007/0253475 A1 * | 11/2007 | Palmer | 375/229 |
| 2008/0069276 A1 | 3/2008 | Wong et al. | |
| 2009/0219983 A1 * | 9/2009 | Gerfers et al. | 375/232 |

FOREIGN PATENT DOCUMENTS

| | | |
|---|---|---|
| JP | 61-133713 | 6/1986 |
| SU | 1658378 | 6/1991 |
| WO | WO 97/36372 | 10/1997 |
| WO | WO 02/05423 | 1/2002 |

OTHER PUBLICATIONS

Choi, J.-S., et al., "A 0.18-µm CMOS 3.5-Gb/s Continuous-Time Adaptive Cable Equalizer Using Enhanced Low-Frequency Gain Control Method," *IEEE Journal of Solid-State Circuits*, (39)3:419-425, (Mar. 2004).

* cited by examiner

*Primary Examiner* — Hirdepal Singh
(74) *Attorney, Agent, or Firm* — Ropes & Gray LLP; Jeffrey H. Ingerman

(57) ABSTRACT

Adaptation convergence in an adaptive dispersion compensation engine (ADCE) of a high-speed serial interface is detected by monitoring the output of the error amplifier of one or more adjustment loops of the ADCE. Adaptation convergence is considered to have been detected upon detection of a predetermined number of transitions in the error amplifier output, each of which occurs within a preselected interval following the previous transition. The detector may be implemented with a timer that times the preselected interval and a counter that counts transitions in the error amplifier output. The timer restarts each time a transition occurs, and the counter outputs a convergence signal when it reaches the predetermined number, but is reset each time the timer reaches the preselected interval. The serial interface may be part of a programmable integrated circuit device and in any case the preselected interval and the predetermined number may be programmable.

14 Claims, 6 Drawing Sheets

PROGRAMMABLE ADAPTATION CONVERGENCE DETECTION

BACKGROUND OF THE INVENTION

This invention relates to the detection of adaptation convergence in an adaptive dispersion compensation engine (ADCE) in a high-speed serial interface. In particular, this invention relates to programmable detection of adaptation convergence in an ADCE.

Many integrated circuit devices can be programmed. Examples of programmable integrated circuit devices include volatile and non-volatile memory devices, field programmable gate arrays ("FPGAs"), programmable logic devices ("PLDs") and complex programmable logic devices ("CPLDs"). Other examples of programmable integrated circuit devices include application-specific integrated circuits (ASICs), processors and microcontrollers that are programmable via internal or external memory. Programmable integrated circuit devices, such as programmable logic devices (PLDs) in particular, frequently incorporate high-speed serial interfaces to accommodate high-speed (i.e., greater than 1 Gbps) serial I/O standards. Typically, a PLD may have multiple high-speed serial interface channels. In use, different ones of such channels may have different characteristics, particularly if the user configures them for different standards, but also because of the length of the serial link involved and transmission conditions between the interface and the remote device. With multiple such channels all having different characteristics, the user is faced with the need to provide different amounts of equalization to compensate for attenuation. The amount of equalization of any particular setting in any particular channel may vary with backplane length, backplane type (e.g., backplane material), backplane aging, process conditions at the time of PLD manufacture, data rate, voltage, temperature, etc.

Manually determining the optimal settings for each link would be extremely time-consuming. There may be large numbers (e.g., hundreds or thousands) of permutations of various programmable settings in each channel. Moreover, selection of the appropriate combination of settings frequently is done by trial-and-error.

PLDs in the STRATIX® family, available from Altera Corporation, of San Jose, Calif., includes an integrated ADCE. The integrated ADCE automatically performs the trial-and-error examination of the output of the equalizer stages and adjusts the equalizer settings to increase or decrease the amount of equalization. This examination is performed in real time, adjusting to the changing environment and the aging process. However, the ADCE does not detect adaptation convergence. Instead, that function has to be performed outside the ADCE in programmable logic, or in software.

SUMMARY OF THE INVENTION

The present invention provides a method, and circuitry, for detecting adaptation convergence in an ADCE.

An ADCE typically includes a high-frequency analog adjustment loop and a low-frequency analog adjustment loop. As convergence approaches in a particular loop, the error amplifier inputs of that loop approach the same value and fluctuate about one another, resulting in an output that is high when a first input is higher than a second input, and low when the second input is higher than the first input. The amplifier output is monitored for each respective loop. As convergence approaches in a loop, the rate at which transitions occur in the output for that loop increases. According to the present invention, adaptation convergence for each loop is detected when a predetermined sufficiently large number of transitions occurs in the respective amplifier output, each within a preselected interval from the previous transition. Both the required number of transitions, and the preselected interval, may be programmable.

Specifically, in accordance with the present invention, there is provided a method of detecting adaptation convergence in an adaptive dispersion compensation engine of a serial receiver, where the adaptive dispersion compensation engine including at least one adjustment loop having an error amplifier that transitions between two output states as inputs to the error amplifier vary. The method includes preselecting a measurement interval, predetermining a repetition number, counting each of the transitions that occurs within the preselected measurement interval of an immediately preceding one of the transitions to provide a transition count, and signalling that convergence has occurred when the transition count reaches the predetermined repetition number.

An adaptation convergence detector, and a programmable integrated circuit device incorporating such a detector, also are provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

As discussed above, adaptation convergence is detected in accordance with the present invention, for each of the high-frequency and low-frequency loops of an adaptive dispersion compensation engine, when a predetermined sufficiently large number of transitions, each within a preselected interval from the previous transition, occurs in the error amplifier output of the respective loop. A large number of transitions sufficiently close together may be taken as a signal that the high-frequency and low-frequency outputs are so close together that they are continually crossing one another, signifying convergence. Both the predetermined number of transitions, and the preselected interval, may be programmable to suit the particular implementation and situation.

Figure 1:
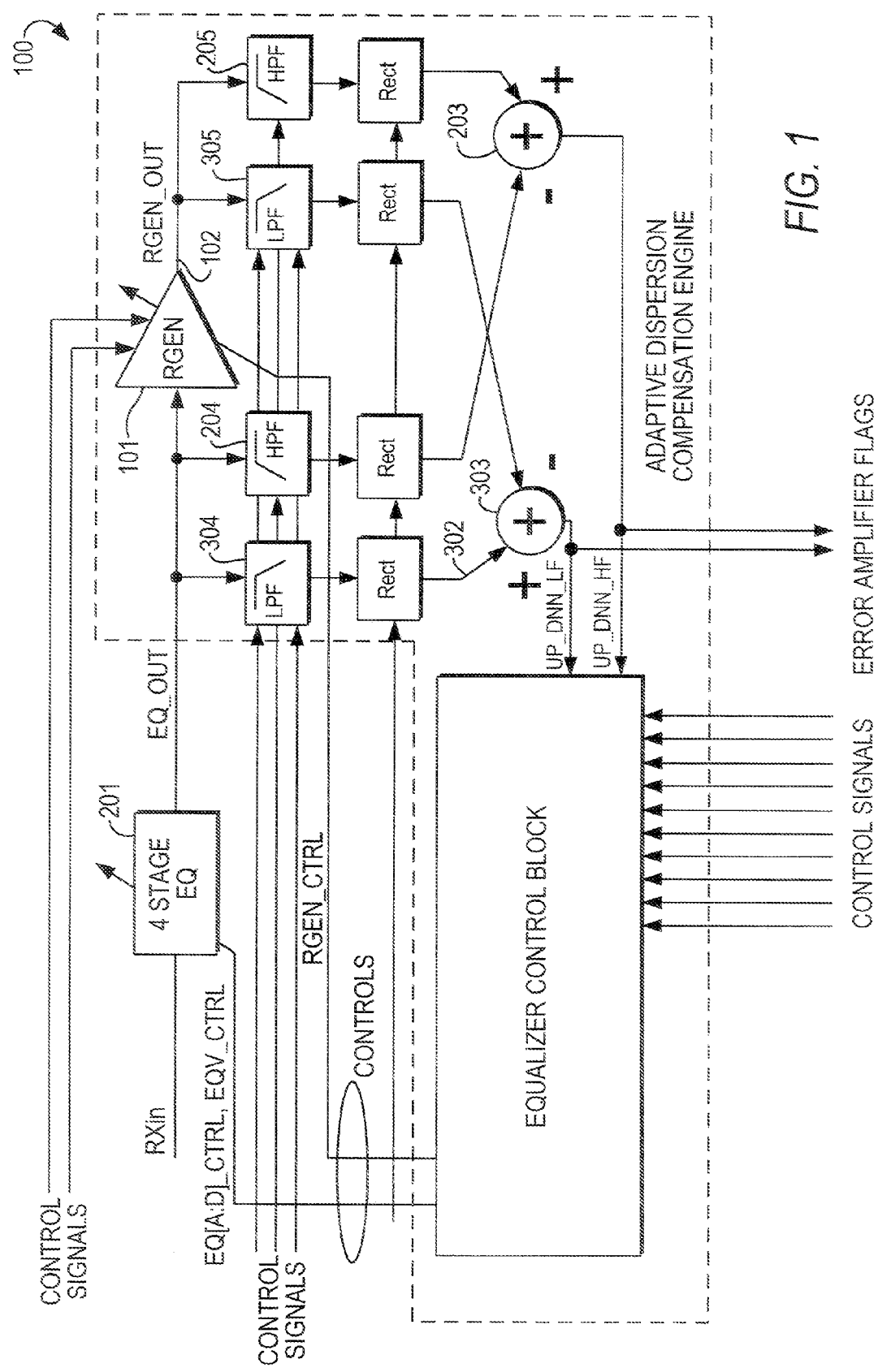
FIG. 1 is a schematic diagram of an adaptive dispersion compensation engine.
Figure 2:
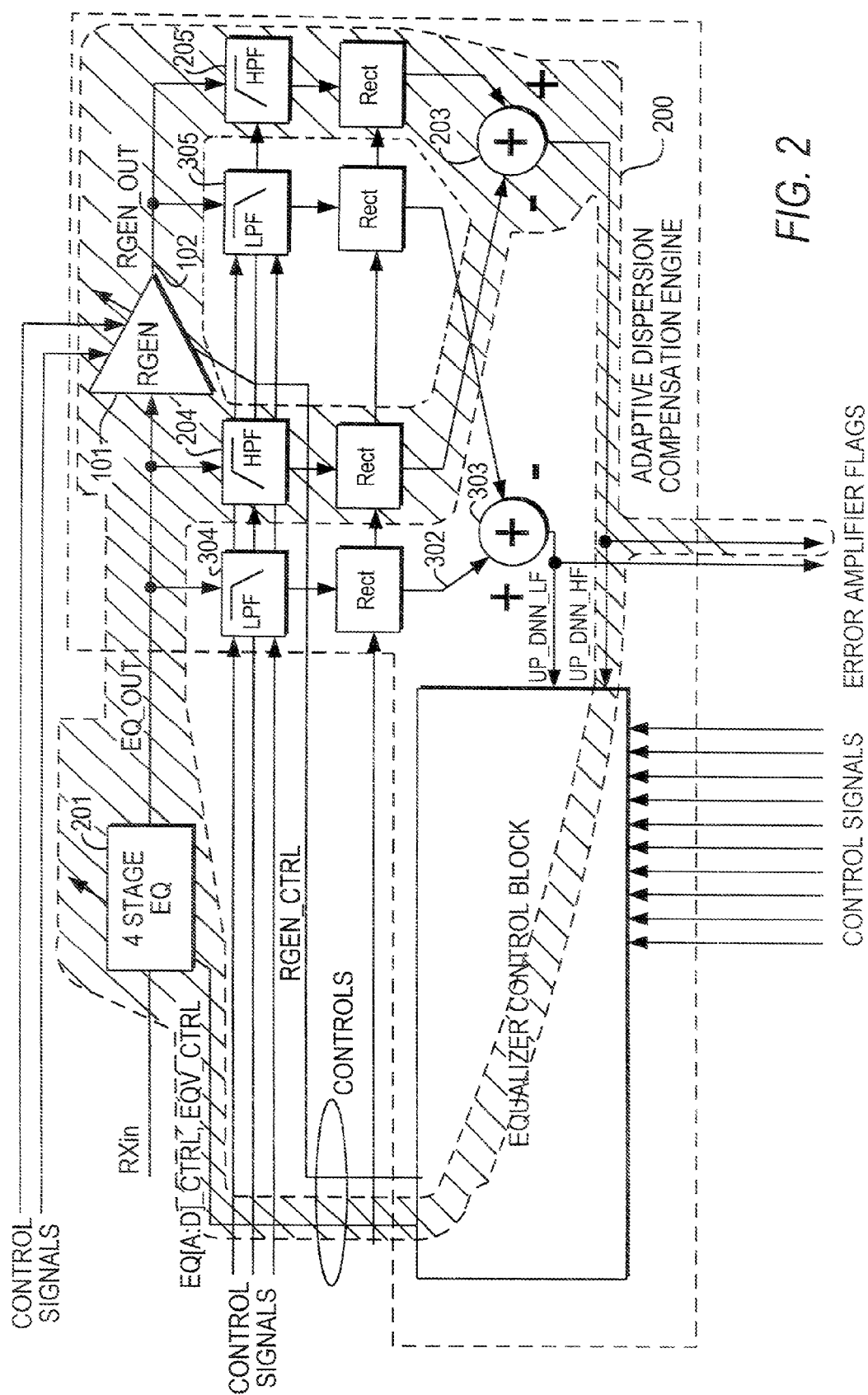
FIG. 2 is the schematic diagram of FIG. 1, with a high-frequency adjustment loop highlighted.
Figure 3:
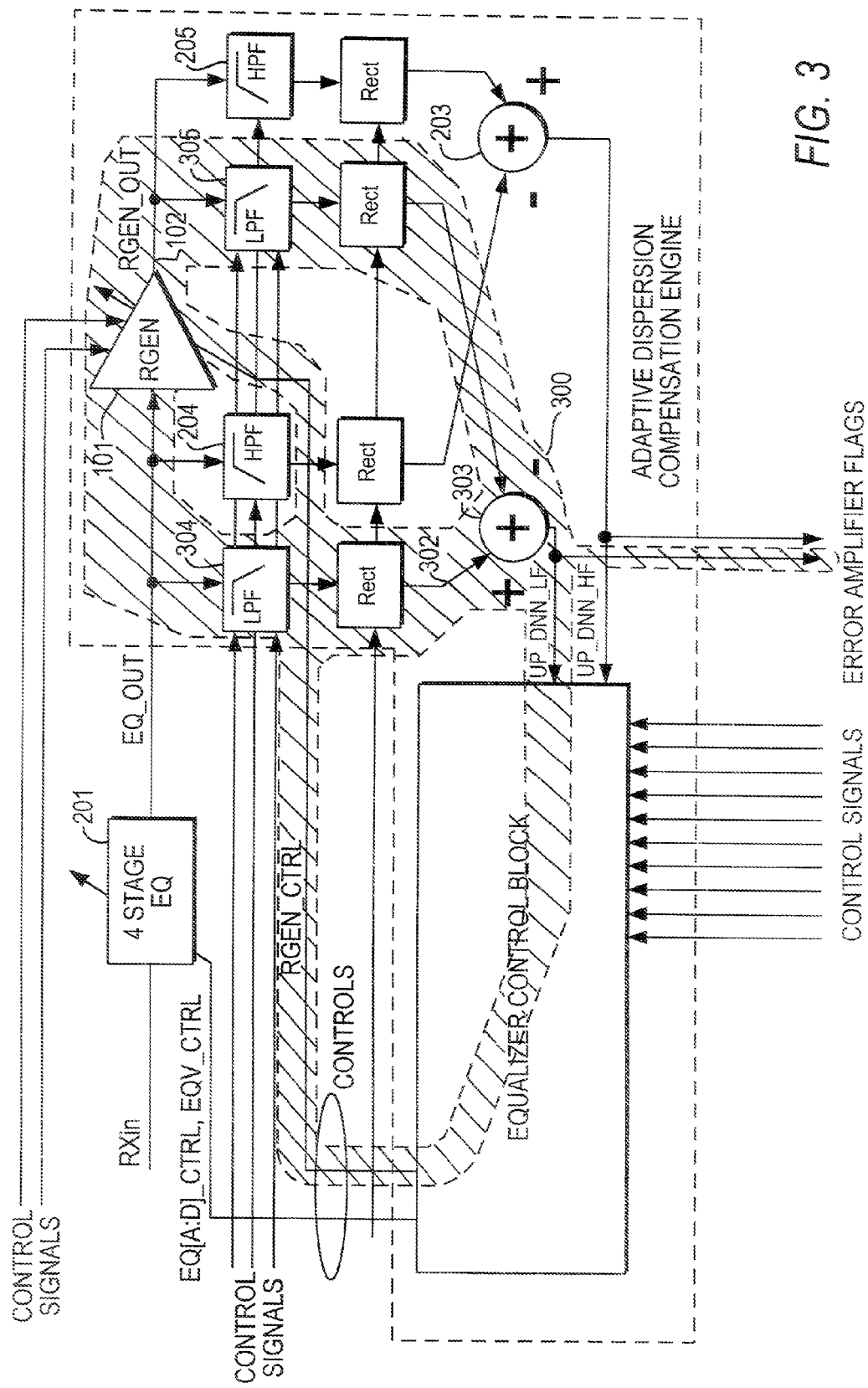
FIG. 3 is the schematic diagram of FIG. 1, with a low-frequency adjustment loop highlighted.

One embodiment of an ADCE 100 in accordance with the present invention is shown in FIG. 1, and includes a high-frequency adjustment loop 200 highlighted in FIG. 2, and a low-frequency adjustment loop 300 highlighted in FIG. 3, where FIGS. 2 and 3 are reproductions of FIG. 1 with loop 200 or 300 highlighted, respectively.

The operation of ADCE 100 is as follows:

First, the low-frequency amplitude of the output 102 of reference generator (RGEN) 101 is matched to the amplitude of the low-frequency output 302 of equalizer 201. The low-frequency amplitude may be thought of as the amplitude when the input signal has had time to sufficiently settle (no closure due to inter-symbol interference). Alternatively, it may be thought of as the signal content when there are several consecutive identical bits.

Next, the high frequency loop 200 adjusts the edge rate of equalizer 102 to match the "ideal" or theoretical edge generated by reference generator 101, so that the high-frequency content of the output of equalizer 102 matches the high-frequency content of the output of reference generator 101. The high-frequency content may be extracted from bit edges or transitions.

For each loop 200, 300, an error amplifier 203, 303 is used to sense and compare the difference in the voltage level between the high-frequency or low-frequency components, respectively, as filtered by high- or low-pass filter 204 or 304, respectively, and the corresponding output of reference generator 101 as filtered by high- or low-pass filter 205 or 305, respectively. The difference represents the amount of energy extracted out from the selected high- or low-frequency components of the output of equalizer 102 and the output of reference edge generator 101. As adaptation convergence is approached for each loop, the energy levels on both inputs of the error amplifier will oscillate about each other, and error amplifier output will alternate between 0 and 1.

Figure 4:
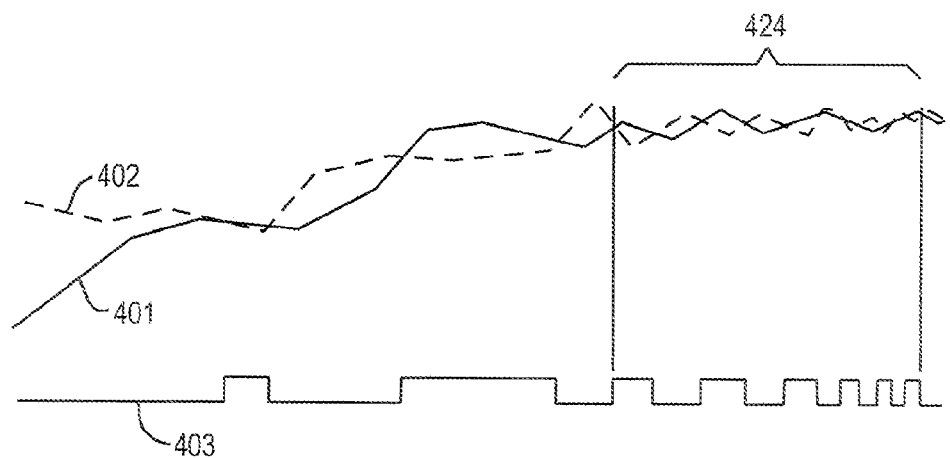
FIG. 4 is a graphical representation of the difference between the error amplifier outputs of one of the adjustment loops of FIGS. 2 and 3.

This behavior is illustrated in FIG. 4, where trace 401 represents one input of the error amplifier 203, 303 of one of the loops, and trace 402 represents the other input of that error amplifier 203, 303. The error amplifier output is represented by trace 403. As can be seen, as the inputs 401, 402 converge, in region 404, the number and frequency of transitions in the output 403 increase. This behavior can be used to detect adaptation convergence.

In accordance with the invention, convergence of one of loops 200, 300 may be detected by selecting an interval, and counting how many consecutive transitions (in either direction, because all that matters is that the inputs have crossed each other) in the loop output 403 occur, each transition occurring before expiration of the selected interval following the previous transition. In other words, if consecutive transitions occur further apart than the selected interval, then there is no convergence. If consecutive transitions occur within the selected interval, then convergence may have occurred. But convergence is not considered to have been detected until a predetermined number of transitions has occurred, with each transition occurring before the expiration of the preselected interval following the previous transition.

The two loops 200, 300 normally will not converge at exactly the same time. Each loop processes the same differential signal, but the two loops may update their feedback decisions at different rates, albeit lower than the data rate of the differential signal. Nevertheless, there may be a relationship between the convergence of one loop and the convergence of the other loop, and each loop normally would be expected to converge within a relatively short time period of convergence of the other loop. Preferably, convergence of both loops should be detected, but detecting convergence of one loop may be sufficient.

Both the preselected interval and the predetermined number may be user-programmable. Lengthening the preselected interval makes it easier to find convergence, while shortening the preselected interval makes it harder to find convergence. Similarly, increasing the predetermined number of transitions required makes it harder to find convergence, while decreasing the predetermined number of transitions required makes it easier to find convergence. The value selected for each parameter is a matter of user choice, depending on the requirements of the particular application. Generally, however, convergence is indicated when the output has been switching polarity sufficiently rapidly for a sufficiently long period. The preselected interval measures how fast polarity is switching, while the predetermined number measures how long sufficiently rapid switching has been taking place. This can be thought of as a matter of quality (switching speed) vs. stability (how long the switching speed is maintained).

Figure 5:
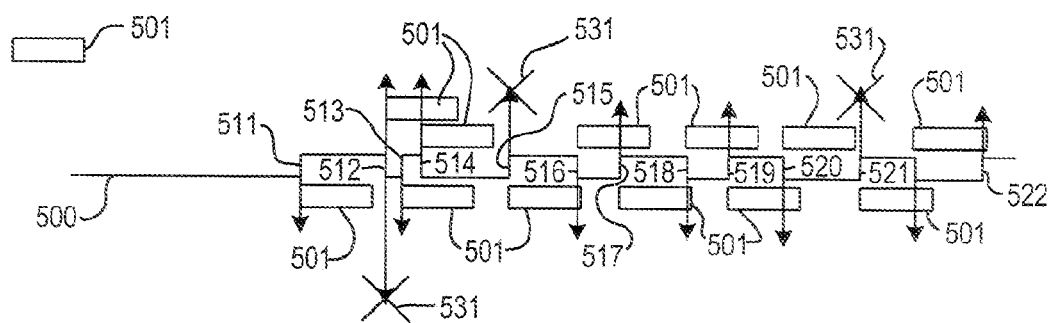
FIG. 5 is a graphical representation of the application, in accordance with the present invention, of a first measurement interval to a difference signal such as that of FIG. 4.
Figure 6:
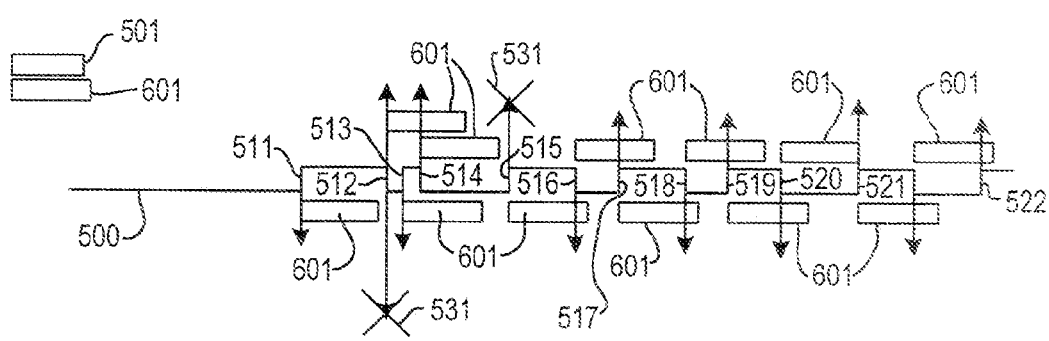
FIG. 6 is a graphical representation of the application, in accordance with the present invention, of a second measurement interval to a difference signal such as that of FIG. 4.

This behavior is illustrated in FIGS. 5 and 6, both of which show the detection of convergence for the same output waveform 500. In FIG. 5, the preselected interval has a duration 501. Second transition 512 occurs after the expiration of preselected interval 501 following first transition 511. Therefore, convergence is not detected regardless of the predetermined number of transitions. Transition 512 is therefore a dead-end as far as a chain of transitions beginning at transition 511 is concerned, as signified by large "X" 531. However, transitions 513 and 514 are well within one preselected interval 501 of transition 512 and of each other. Therefore, starting at transition 512, for a predetermined number of either 2 or 3, convergence would be detected at transition 513 or 514, respectively.

Transition 515 is not within the preselected interval 501 following transition 514. Therefore, transition 515 is a dead-end for any chain of transitions starting after the previous dead-end at transition 512. Thus, for a chain starting at transition 512, transition 515 would be a dead-end if the predetermined number were 4 or higher; for a chain starting at transition 513, transition 515 would be a dead-end if the predetermined number were 3 or higher; for a chain starting at transition 514, transition 515 would be a dead-end if the predetermined number were 2 or higher (i.e., for any chain, insofar as the minimum possible predetermined number is 2).

Starting at transition 515, each of transitions 516-520 is within the preselected interval 501 from the previous transition. Thus, for a chain starting at transition 515, convergence would be found if the predetermined number had any value between 2 and 6, while for that same chain, transition 521 would be a dead-end if the predetermined number were 7 or higher; for a chain starting at transition 516, transition 521 would be a dead-end if the predetermined number were 6 or higher; for a chain starting at transition 517, transition 521 would be a dead-end if the predetermined number were 5 or higher; for a chain starting at transition 518, transition 521 would be a dead-end if the predetermined number were 4 or higher; for a chain starting at transition 519, transition 521 would be a dead-end if the predetermined number were 3 or higher; and for a chain starting at transition 520, transition 521 would be a dead-end if the predetermined number were 2 or higher.

Starting again at transition 521, that transition and the next two transitions 522, 523 are within one preselected interval 501 of each other, so that for a chain starting at transition 521, convergence would be found if the predetermined number had a value of 2 or 3, while for a chain starting at transition 522, convergence would be found if the predetermined number had a value of 2. Based on the data visible in FIG. 5, it is not possible to determine, for chains beginning at transitions 521, 522 and 523, whether convergence would be detected for higher predetermined numbers.

Table 1 below summarizes the results for FIG. 5, with an "x" signifying no convergence, a "+" signifying convergence, and a "?" signifying insufficient information to determine convergence:

TABLE 1

| Starting Transition | Predetermined number | | | | | |
|---|---|---|---|---|---|---|
| | 2 | 3 | 4 | 5 | 6 | 7 |
| 511 | x | x | x | x | x | x |
| 512 | + | + | x | x | x | x |
| 513 | + | x | x | x | x | x |
| 514 | x | x | x | x | x | x |
| 515 | + | + | + | + | + | x |
| 516 | + | + | + | + | x | x |
| 517 | + | + | + | x | x | x |
| 518 | + | + | x | x | x | x |
| 519 | + | x | x | x | x | x |
| 520 | x | x | x | x | x | x |
| 521 | + | + | ? | ? | ? | ? |
| 522 | + | ? | ? | ? | ? | ? |
| 523 | ? | ? | ? | ? | ? | ? |

In FIG. 6, the preselected interval has a duration 601, which, as illustrated, is about 9% longer than duration 501. Second transition 512 still occurs after the expiration of preselected interval 601 following first transition 511. Therefore, here also convergence is not detected regardless of the predetermined number of transitions. Transition 512 is therefore a dead-end as far as a chain of transitions beginning at transition 511 is concerned, as signified by large "X" 631, even with the longer duration 601. However, here again transitions 513 and 514 are well within one preselected interval 601 of transition 512 and of each other. Therefore, starting at transition 512, for a predetermined number of either 2 or 3, convergence would be detected at transition 513 or 514, respectively.

Transition 515 is not within the preselected interval 601 following transition 514. Therefore, transition 515 again is a dead-end for any chain of transitions starting after the previous dead-end at transition 512. Thus, again, for a chain starting at transition 512, transition 515 would be a dead-end if the predetermined number were 4 or higher; for a chain starting at transition 513, transition 515 would be a dead-end if the predetermined number were 3 or higher; for a chain starting at transition 514, transition 515 would be a dead-end if the predetermined number for any chain.

Because preselected interval 601 is longer, if only slightly, than preselected interval 501, in FIG. 6, starting at transition 515, each of transitions 516-523 is within the preselected interval 601 from the previous transition. Thus, for a chain starting at transition 515, convergence would be found if the predetermined number had any value between 2 and at least 9. Beyond that, there is not enough information in FIG. 6.

Table 2 below summarizes the results for FIG. 6, again with an "x" signifying no convergence, a "+" signifying convergence, and a "?" signifying insufficient information to determine convergence:

TABLE 2

| Starting Transition | Predetermined number | | | | | | | |
|---|---|---|---|---|---|---|---|---|
| | 2 | 3 | 4 | 5 | 6 | 7 | 8 | 9 |
| 511 | x | x | x | x | x | x | x | x |
| 512 | + | + | x | x | x | x | x | x |
| 513 | + | x | x | x | x | x | x | x |
| 514 | x | x | x | x | x | x | x | x |
| 515 | + | + | + | + | + | + | + | + |
| 516 | + | + | + | + | + | + | + | ? |
| 517 | + | + | + | + | + | + | ? | ? |
| 518 | + | + | + | + | + | ? | ? | ? |
| 519 | + | + | + | + | ? | ? | ? | ? |
| 520 | + | + | + | ? | ? | ? | ? | ? |
| 521 | + | + | ? | ? | ? | ? | ? | ? |
| 522 | + | ? | ? | ? | ? | ? | ? | ? |
| 523 | ? | ? | ? | ? | ? | ? | ? | ? |

Comparing Tables 1 and 2, and FIGS. 5 and 6, one can see that increasing the duration of preselected interval 601 as compared to preselected interval 501 increases the likelihood of a determination of convergence, regardless of the value of the predetermined number. As stated above, the preselected interval measures how fast polarity is switching, while the predetermined number measures how long sufficiently rapid switching has been taking place. Therefore, if for a particular application one can tolerate slower switching (longer preselected interval), one will detect convergence sooner regardless of how long (predetermined number) one determines that the sufficiently rapid switching must last before convergence occurs, because simply reaching a state of sufficiently rapid switching will be easier. Similarly, if for a particular application one can tolerate a shorter period (lower predetermined number) of sufficiently rapid switching, one will detect convergence sooner regardless of how rapid one determines that the switching must be, because once a state of sufficiently rapid switching is reached, it would not have to be maintained as long.

In these examples, the longer interval 601 (meaning that less rapid switching—representing a lower quality signal—is required) results in one fewer dead-end 531. At the same time, decreasing the predetermined number (decreasing how long the sufficiently rapid switching must last, or accepting less stability) also makes it easier to find convergence, regardless of the duration of the preselected interval (i.e., regardless of how rapid the switching must be).

The method can be used to evaluate stability for various adaptive corner frequencies and programmable adaptation sequences to derive the best possible adaptive settings. Generally, a corner frequency sets a cutoff of the input frequency spectrum to extract low and high energy levels. How well these energy levels are separated and detected determines how well the ADCE adapts. Different corner frequencies may be better for adaptation for different types of data. Process, temperature and supply variations may make it difficult to determine which is best. However, if the present invention is applied to various corner frequencies for a particular application, it can be expected that few will converge, and of those that do converge, many if not most will converge only at parameters (longer preselected interval and lower predetermined number) that indicate poor stability (even close to random). The corner frequency that converges with the best parameters (shortest preselected interval and highest predetermined number) can used for that application.

Conceptually, circuitry for performing the foregoing method would include a detector for detecting transitions, a timer for measuring the passage of the preselected interval, and a counter, with a programmable threshold that can be set to a predetermined number, that can provide a positive output when the programmable threshold—i.e., the predetermined number—is reached. When a transition is detected, the timer would begin running and the counter would be incremented. If the timer were to reach the preselected interval before another transition were detected, the counter would be reset and the timer would be reset to start again at the next transition detection. If another transition were detected before the timer were to reach the preselected interval, the timer still would be reset, but the counter would be incremented again instead of being reset. Convergence would be indicated if the counter were to reach the predetermined number before being reset by the timer reaching the preselected interval without detection of a transition.

Circuitry for performing this function preferably is provided in hard logic, but could be configured from programmable logic of a programmable integrated circuit device such as a PLD. Even if the circuit were in hard logic, the timer and the counter threshold preferably are programmable to allow adjustment of the parameters.

Figure 7:
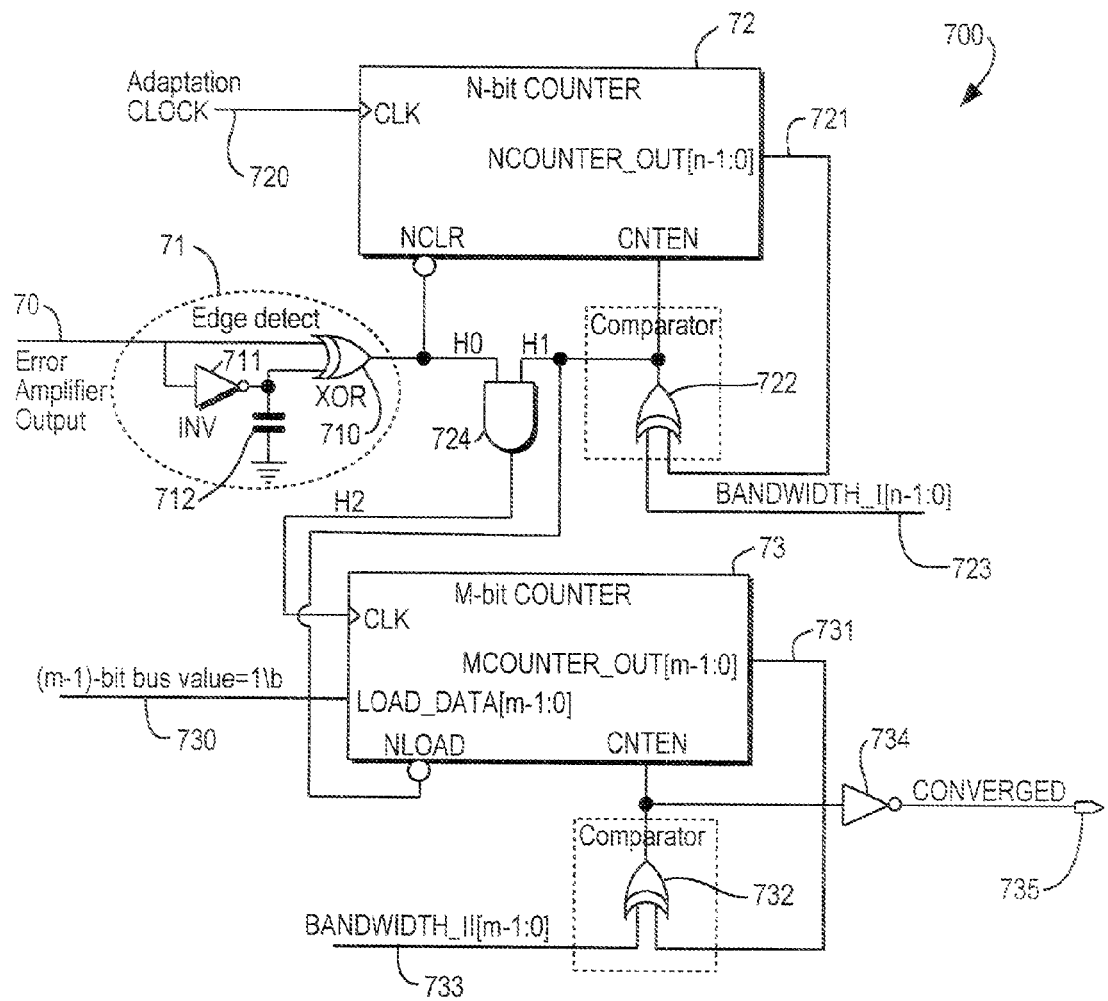
FIG. 7 is a schematic representation of an embodiment of a circuit according to the present invention for making the measurements shown in FIGS. 5 and 6.

One example of such a circuit 700, one of which may be provided for each loop, is shown in FIG. 7. The loop error amplifier output 70 is input to edge-detect logic 71 which includes exclusive-OR gate 710, inverter 711 and capacitor 712. In a steady state of signal 70, regardless of what that state is, the two inputs to XOR 710 will be different, and therefore edge-detect output H0 will be high.

However, during a transition, the inputs will not change instantaneously, particularly in view of the presence of capacitor 712. Therefore, for a short time, the two inputs to XOR 710 will be the same, and edge-detect output H0 will go low.

N-bit counter 72 may be provided to time the preselected interval, while M-bit counter 73 may be provided to count the predetermined number. N should be chosen so that $2^N$ clock cycles is not smaller than the largest possible preselected interval, while M should be chosen so that $2^M$ is not smaller than the largest possible predetermined number. N-bit counter 72 is clocked by adaptation clock 720, and is cleared—i.e., reset—when edge-detect signal H0 goes low. The value of N-bit counter 72 is output at 721 and compared by exclusive-OR gate 722 to preselected interval signal 723. As long as output 721 is not equal to preselected interval signal 723, signal H1, the output of XOR 722, will be high, meaning that N-bit counter 72 will be enabled, and AND gate 724 will pass along any edge-detect signal H0 as clock input H2 to M-bit counter 73.

If the preselected interval is reached, the desired result in accordance with the foregoing description is that N-bit counter 72 will reset and stop counting until another transition occurs, and the M-bit counter 73 also will reset. This occurs as output 721 will become equal to preselected interval signal 723, causing signal H1 to go low. This will cause signal H2 to also go low, stopping M-bit counter 73 from counting by zeroing its clock input, and also will cause M-bit counter 73 to reset to its default initial value by loading the value on data input 730, which preferably is a binary 1. At the same time, H1 going low will disable N-bit counter 72, freezing its output and thereby maintaining H1 low and maintaining M-bit counter 73 in a non-counting state.

When the next transition is detected by edge-detect logic 71, H0 will go low, clearing N-bit counter 72, so that output 721 is no longer the same as preselected interval signal 723. This will cause H1 to go high, re-enabling N-bit counter 72 and allowing edge-detect signal H0 to be passed through AND gate 724 as clock input H2 to M-bit counter 73, and also releasing the reload input of M-bit counter 73. M-bit counter 73 will therefore begin counting again, but will have missed the first transition, which is why it is loaded with a "1" when reset, rather than simply being cleared to "0".

M-bit counter 73 is enabled by the output of exclusive-OR gate 732, whose inputs are M-bit counter output 731 and predetermined number signal 733. Assuming that N-bit counter 72 does not reach the preselected interval, M-bit counter 73 will continue to count transitions until M-bit counter output 731 is equal to the predetermined number signal 733. At such time, the output of XOR 732 will go low, sending the output of inverter 734 high, to indicate convergence at 735. At the same time, M-bit counter 73 is disabled by the low output of XOR 732, so that it stops counting. M-bit counter output 731 thus continues to be equal to predetermined number signal 733, locking convergence signal 735 to high.

This condition will obtain unless and until lock is lost, when N-bit counter 72, which continues to count, reaches the preselected interval. At that point, M-bit counter 73, and hence output 731, will be reset to "1", the output of XOR 732 will go high, and the process will resume. Note, however, that at this point, M-bit counter 73 will not resume counting until load signal H1 and clock H2 are released by N-bit counter 72 detecting another transition.

If circuit 700 is implemented in a programmable integrated circuit device (e.g., a PLD), whether in fixed logic or programmed programmable logic, one or both of preselected interval signal 723 and predetermined number signal 733 may be stored in registers (not shown) whose values are programmable, thereby making these convergence parameters programmable or settable by a user.

Thus it is seen that a method and circuitry for adaptation convergence detection have been provided.

Figure 8:
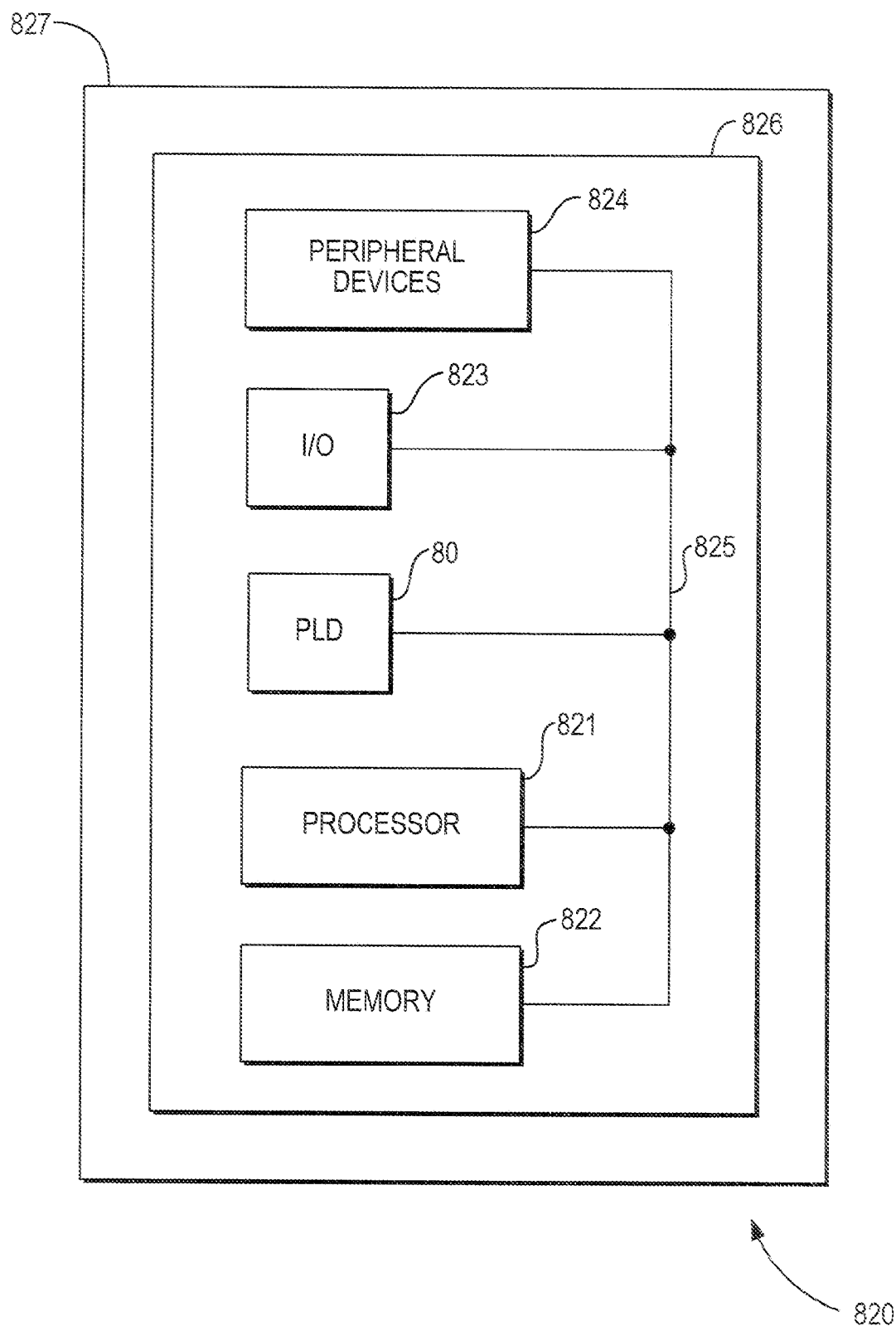
FIG. 8 is a simplified block diagram of an illustrative system employing a programmable logic device incorporating the present invention.

A PLD 80 incorporating the present invention may be used in many kinds of electronic devices. One possible use is in a data processing system 820 shown in FIG. 8. Data processing system 820 may include one or more of the following components: a processor 821; memory 822; I/O circuitry 823; and peripheral devices 824. These components are coupled together by a system bus 825 and are populated on a circuit board 826 which is contained in an end-user system 827.

System 820 can be used in a wide variety of applications, such as computer networking, data networking, instrumentation, video processing, digital signal processing, or any other application where the advantage of using programmable or reprogrammable logic is desirable. PLD 80 can be used to perform a variety of different logic functions. For example, PLD 80 can be configured as a processor or controller that works in cooperation with processor 821. PLD 80 may also be used as an arbiter for arbitrating access to a shared resources in system 820. In yet another example, PLD 80 can be configured as an interface between processor 821 and one of the other components in system 820. It should be noted that system 820 is only exemplary, and that the true scope and spirit of the invention should be indicated by the following claims. For example, other instances of system 820 may include other types of programmable integrated circuits that incorporate the present invention instead of or in addition to the PLD 80 and/or processor 821.

Various technologies can be used to implement PLDs 80 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of detecting adaptation convergence in an adaptive dispersion compensation engine of a serial receiver, said adaptive dispersion compensation engine including at least one adjustment loop having an error amplifier the output of which undergoes transitions between two output states as inputs to said error amplifier vary, said method comprising:
preselecting a measurement interval;
predetermining a repetition number;
counting each of said transitions that follows an immediately preceding one of said transitions by at most said preselected measurement interval to provide a transition count, said counting comprising:
incrementing said transition count each time a transition follows an immediately preceding one of said transitions by at most said preselected measurement interval, and
resetting said transition count when said preselected measurement interval elapses following one of said transitions without another transition occurring; and
signalling that convergence has occurred when said transition count reaches said predetermined repetition number.

2. The method of claim 1 wherein said adaptive dispersion compensation engine includes two of said adjustment loops, said method comprising:
performing said counting for each of said two adjustment loops to provide a respective transition count for each of said adjustment loops; wherein:
said preselecting a measurement interval comprises preselecting a respective measurement interval for each of said adjustment loops;
said predetermining a repetition number comprises predetermining a respective repetition number for each of said adjustment loops;
said signalling comprises signalling that convergence has occurred when said transition count for at least one of said adjustment loops reaches said respective predetermined repetition number for said at least one of said adjustment loops.

3. The method of claim 2 wherein said signalling comprises signalling that convergence has occurred when said respective transition counts for both of said adjustment loops reach said respective predetermined repetition numbers.

4. An adaptation convergence detector for an adaptive dispersion compensation engine of a serial receiver, said adaptive dispersion compensation engine including at least one adjustment loop having an error amplifier the output of which undergoes transitions between two output states as inputs to said error amplifier vary, said adaptation convergence detector comprising:
a transition detector that detects said transitions;
a timer that measures a preselected measurement interval following detection of one of said transitions by said transition detector, said timer restarting each time one of said transitions is detected; and
a repetition counter that increments each time said transition detector detects one of said transitions; wherein:
said repetition counter resets when said timer indicates that said preselected measurement interval has elapsed, such that each of said transitions that follows an immediately preceding one of said transitions by at most said preselected measurement interval is counted by said repetition counter; and
said repetition counter outputs a convergence signal when said repetition counter reaches a predetermined repetition number.

5. The adaptation convergence detector of claim 4 wherein said adaptive dispersion compensation engine includes at least two of said adjustment loops, said adaptation convergence detector comprising:
at least one of said transition detectors for at least one of said at least two adjustment loops;
at least one of said timers for said at least one of said at least two adjustment loops; and
at least one of said repetition counters for said at least one of said at least two adjustment loops.

6. The adaptation convergence detector of claim 5 comprising:
a respective one of said transition detectors for each of said at least two adjustment loops;
a respective one of said timers for each of said at least two adjustment loops; and
a respective one of said repetition counters for each of said at least one of said at least two adjustment loops; wherein:
detection of convergence requires a convergence signal from at least one of said repetition counters.

7. The adaptation convergence detector of claim 6 wherein: detection of convergence requires a convergence signal from each of said repetition counters.

8. The adaptation convergence detector of claim 4 wherein at least one of said preselected measurement interval of said timer and said predetermined repetition number of said repetition counter is programmable.

9. An integrated circuit device comprising:
programmable circuitry; and
input/output circuitry in communication with said programmable circuitry, said input/output circuitry including a high-speed serial interface, said high-speed serial interface having an adaptive dispersion compensation engine including (a) at least one adjustment loop having an error amplifier the output of which undergoes transitions between two output states as inputs to said error amplifier vary, and (b) and adaptation convergence detector, said adaptation convergence detector comprising:
a transition detector that detects said transitions;
a timer that measures a preselected measurement interval following detection of one of said transitions by said transition detector, said timer restarting each time one of said transitions is detected; and
a repetition counter that increments each time said transition detector detects one of said transitions; wherein:
said repetition counter resets when said timer indicates that said preselected measurement interval has elapsed, such that each of said transitions that follows an immediately preceding one of said transitions by at most said preselected measurement interval is counted by said repetition counter; and
said repetition counter outputs a convergence signal when said repetition counter reaches a predetermined repetition number.

10. The integrated circuit device of claim 9 wherein:
said adaptive dispersion compensation engine includes at least two of said adjustment loops; and
said adaptation convergence detector comprises:
at least one of said transition detectors for at least one of said at least two adjustment loops,
at least one of said timers for said at least one of said at least two adjustment loops, and
at least one of said repetition counters for said at least one of said at least two adjustment loops.

11. The integrated circuit device of claim 10 wherein:
said adaptation convergence detector comprises:
- a respective one of said transition detectors for each of said at least two adjustment loops,
- a respective one of said timers for each of said at least two adjustment loops, and
- a respective one of said repetition counters for each of said at least two adjustment loops; and detection of convergence requires a convergence signal from at least one of said repetition counters.

12. The integrated circuit device of claim 11 wherein detection of convergence requires a convergence signal from each of said repetition counters.

13. The integrated circuit device of claim 9 wherein at least one of said preselected measurement interval of said timer and said predetermined repetition number of said repetition counter is programmable.

14. The integrated circuit device of claim 9 wherein said integrated circuit device is a programmable logic device.

* * * * *